(12) United States Patent
Sato

(10) Patent No.: US 6,235,133 B1
(45) Date of Patent: May 22, 2001

(54) CONVEYOR BELT AND METHOD OF MAKING THE SAME

(75) Inventor: Keishi Sato, Fujisawa (JP)

(73) Assignee: Bridgestone Corp., Tokyo (JP)

( * ) Notice: Subject to any disclaimer, the term of this patent is extended or adjusted under 35 U.S.C. 154(b) by 0 days.

(21) Appl. No.: 09/177,847

(22) Filed: Oct. 22, 1998

Related U.S. Application Data

(62) Division of application No. 09/095,775, filed on Jun. 10, 1998, which is a continuation of application No. 08/876,711, filed on Jun. 16, 1997.
(60) Provisional application No. 60/027,090, filed on Sep. 30, 1996.

(51) Int. Cl.[7] .............................. B32B 7/00; B32B 31/26
(52) U.S. Cl. ...................... 156/78; 156/137; 156/309.6; 428/306.6; 428/308.4; 428/319.3
(58) Field of Search .............................. 156/78, 137, 140, 156/309.6; 428/306.6, 308.4, 319.3

(56) References Cited

U.S. PATENT DOCUMENTS 4,133,927 * 1/1979 Tomoda et al. ...................... 428/215
4,744,843 * 5/1988 Lewis ...................................... 156/87

* cited by examiner

*Primary Examiner*—Sam Chuan Yao
(74) *Attorney, Agent, or Firm*—Ostrolenk, Faber, Gerb & Soffen, LLP

(57) ABSTRACT

A method of manufacturing a conveyor belt having an elongate body made of uncured rubber and/or synthetic rubber. A polymeric parting material is placed adjacent to the upper and lower surfaces of the body, and heated platens are applied to the upper and lower surfaces of the body (i.e. belt material) to soften the adjacent upper and lower layer portions of the belt. This causes the softened belt material to flow into interstitial openings in the parting material. The resulting belt has the parting material squeezed into a thinner layer and embedded in the adjacent surface portions of the body of the belt. This provides a substantially uniform and reflectively soft texture surface.

6 Claims, 2 Drawing Sheets

CONVEYOR BELT AND METHOD OF MAKING THE SAME

This is a division of Ser. No. 09/095,775 filed Jun. 10, 1998, which is a continuation of Ser. No. 08/876,711 filed Jun. 16, 1997, which is based upon and claims priority of Ser. No. 60/027,090 filed Sep. 30, 1996, the disclosures of which are incorporated by reference.

BACKGROUND OF THE INVENTION a) Field of the Invention

The present invention relates to a conveyor belt and a method of making the same, and more particularly such a conveyor belt and method utilizing, as a parting material, polymeric material which becomes part of the finished surface of the conveyor belt.

b) Background Art

A common method of manufacturing a conveyor belt is to provide a body of material in an elongate belt configuration having upper and lower surfaces with the material of the conveyor belt comprising at least in large part rubber and/or synthetic rubber. The conveyor belt body is positioned between upper and lower heated platens, which are then pressed against the conveyor belt body to cause vulcanization of the rubber and/or synthetic rubber (hereinafter to be referred to as "rubber"). Quite commonly, reinforcing material is provided between layers of the rubber material that is to form the body, such as steel cables, fabric or other material. Further, the layers of the belt body can differ in composition, such as an inner layer or layers being made of a cushioned rubber material, and the outer layers being of a cover rubber material.

It is usually necessary to provide some sort of parting agent at the upper and lower surfaces of the body which is positioned between and pressed by the platens, so that upon completion of the application of heat and pressure to cause vulcanization of the rubber material, the platens can be properly separated from the belt section that has just been formed. One common method of doing this is using a chemical or a fabric like material to provide a release and prevent sticking. Chemical releases can be in the form of a powder (e.g. talc), a liquid (e.g. silicone spray) or a solid (paraffin waxes). These are applied to the top and bottom surfaces of the belt. Also, as a parting agent, fabric materials can be utilized (e.g. a fine strand square woven polyester cloth). The cloth is removed after vulcanizing. Also, light random wisps of synthetic or natural material (e.g. nylon or cotton-like "angel hair") is used. One type of such material is manufactured under the trademark "CEREX". This material which is very thin is vulcanized into the belt surface and becomes part of the belt).

There are a number of significant considerations relating to the character of the upper and lower surface portions of the belt. One such consideration is the appearance of these upper and lower surfaces. It often happens that during the vulcanizing process where the platens are applied against the belt section, the color, shading or texture of the belt surface may become non-uniform so that there are "splotches" of a differing shade and/or color that degrade the appearance of the belt. Also, if the belt has a highly reflective surface (i.e. a mirror-like surface) the splotches become substantially more noticeable than if there is a reflectively soft textured surface.

Another consideration regarding the character of the surface of the belt is its elastomeric qualities. As a loaded belt passes over the support rollers, there is an indentation of the belt surface portion in contact with the rollers. If the surface portion of the belt has poorer elastomeric qualities, then more energy is required to move the belt over the rollers, thus requiring more powerful motors. On the other hand, if the surface portion of the belt recovers from the compression more resiliently, the energy required to move the belt is diminished.

A search of the U.S. patent literature has revealed a number of patents, these being the following:

U.S. Pat. No. 4,744,843 (Lewis) discloses the use of a releasing agent for a conveyor belt. In column 1, line 35 and following the invention is described as follows:

> "I have discovered that a polymeric monomer nonwoven fabric made preferably directly from molten polymer as preferably continuous filaments that are entangled and may or may not be bonded at each crossover point can be used as a very satisfactory mold release in molding belts and related materials and the nonwoven fabric becomes a part of the molded article. The resulting molded article has an improved appearance of the article due to the elimination of trapped air or gases and the elimination of mold release build-up with its effect on appearance of the molded article."

U.S. Pat. No. 4,411,947 (Haynhold) shows a conveyor belt having a body of rubber or synthetic materials with steel cable reinforcing. The belt is formed with an elastically deformable cushioning insert which contains air pockets and is embedded in either the upper and/or lower cover layer. The problem toward which this is directed is that the conveyor belt is stressed at the loading location since the material being loaded is usually dropped onto the belt. Accordingly, these air pockets cushion the belt to withstand these impacts. There is a double weave cloth 5 comprising two fabric layers 15 and these are interconnected by the threads 25 to keep them in parallel relationship.

U.S. Pat. No. 2,841,515 (Runton et al) shows a belt made of canvas layers having between the layers a synthetic foam which bonds the canvas layers together. A layer of the foam is also placed on the face of the belt when required for a protective coating to prevent cutting or tearing the belt when hard objects fall on it.

U.S. Pat. No. 2,515,778 (Knowland et al) discloses a belt which is adapted for use in the canning and food handling industry. The body of the belt is made of "rubberized multiple plys vulcanized into a unit and covered with synthetic plastic composition bonded and vulcanized thereto." The layer is of a light color, odorless and resistant to solvents, oils, fats, etc. The plastic composition and a fabric sheet are bonded under pressure and heat to soften the plastic so that it permeates and bonds to the fabric sheets.

SUMMARY OF THE INVENTION

In the method of the present invention, there is first provided an elongate body having upper and lower surfaces. The body comprises a material which is uncured rubber, synthetic rubber, or combinations thereof, and this body material has a vulcanizing temperature.

A parting material is placed adjacent to at least one of the upper and lower surfaces of the body. The parting material comprises a polymeric material having interstitial open spaces and a melting or degradation temperature higher than the vulcanizing temperature.

Heated platen means are applied to the upper and lower surfaces of the body to at least soften surface portions of the body adjacent to the parting material and causing at least part of the body portion to flow into the interstitial open spaces of the parting material, and also cause the body material to vulcanize to form a conveyor belt section.

The platen means are then withdrawn from the conveyor belt section.

The conveyor belt section which is made by the process is characterized in that the parting material and the adjacent belt surface portion become combined with the parting material being embedded in the adjacent surface portion of the body to provide a substantially uniform and reflectively soft surface texture.

In the method of the present invention, the parting material is an open cell foam with a maximum pore size of between about 0.5 and 4 millimeters, and desirably between about 0.5 and 2 millimeters.

In the preferred form, the parting material is a cured elastomer. Also, in the preferred form, the parting material has a tan δ of no greater than 0.1, and more desirably no greater than about 0.03.

The preferred parting material comprises at least one polymer which ia a polyethylene, polypropylene, polybutene, polyhexane, polyurethane, polyamide, polyamid 6, polyamid 66, polycarbonate, polyacetal, polyacrylate, polybutylene telephthelate, polyphenylene oxide, polyurea, silicone, polyester terephthalate, polyheptene or cross linked polyolefin.

The belt made in accordance with the process of the present invention comprises the elongate body of a material which is uncured rubber, synthetic rubber or combinations thereof. The parting material is a material as described above, and this is embedded in at least one surface portion of the elongate body, and preferably on both upper and lower surfaces of the elongate body. Other features of the present invention will become apparent from the following detailed description.

DESCRIPTION OF THE PREFERRED EMBODIMENT

Figure 1A:
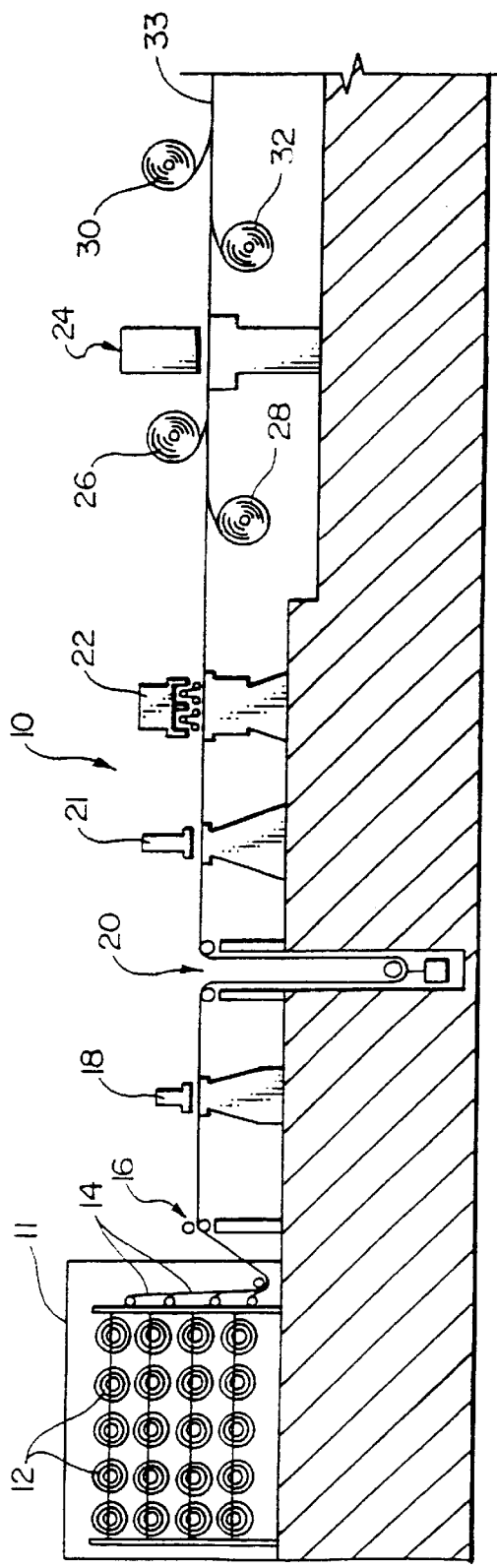
FIGS. 1A and 1B present a somewhat schematic view illustrating forward and rear portions of a single prior art conveyor belt manufacturing system which can be adapted to utilize the present invention.
Figure 1B:
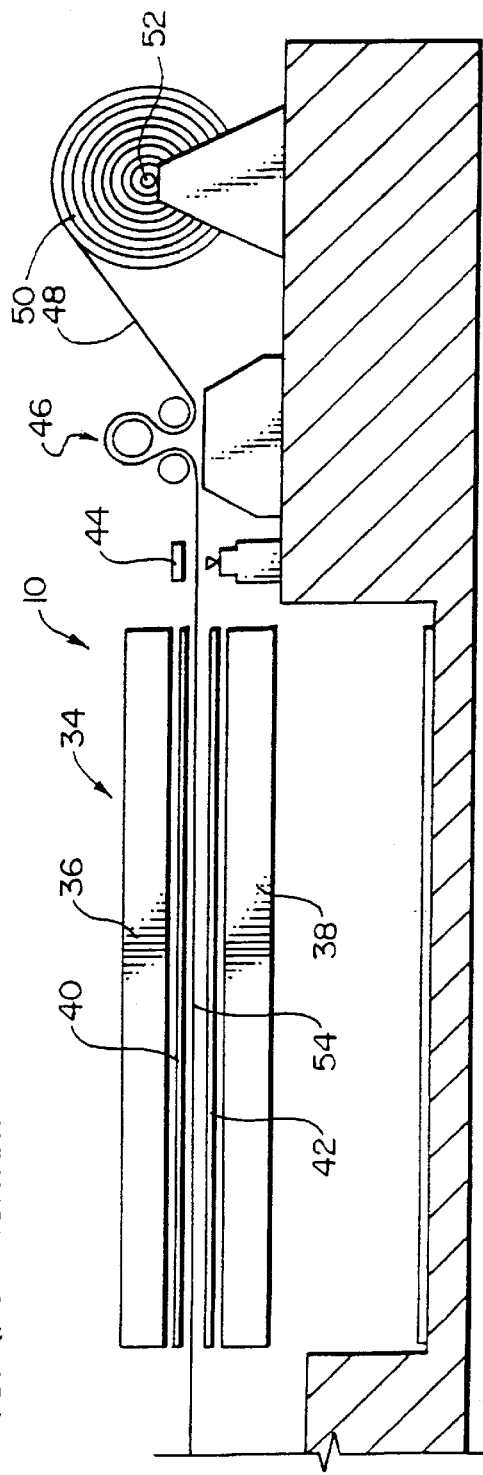

With reference to FIGS. 1A and 1B, there is shown a prior art belt manufacturing operation to which the present invention has been adapted. There will first be a description of the components which already exist in the prior art belt manufacturing system, and then a description of how the present invention is incorporated in these.

The belt manufacturing system (generally designated 10) shown in FIG. 1 comprises at the left end a reel feeder 11 where there is a plurality of drums 12 which feed steel cables 14 over a guide roll assembly 16 and through a first clamp 18. From the first clamp 18, the cables are directed through a pretension station 20, thence through a second clamp 21 to a tensioning device 22.

From the tensioning device 22, the cables 16 are directed into a calendaring section 24 where layers of rubber material are moved into the path of travel of the cables 14 to be positioned above and below the reinforcing cables 14. More specifically, there are upper and lower rolls 26 and 28, respectively, which feed upper and lower layers of cushion rubber into the path of travel, and following this there are upper and lower rolls 30 and 32 having layers of cover rubber that are applied above and below the cushion rubber layers. As in common in the prior art, various apparatus or devices are incorporated in this calendaring section 24 to properly position the layers of rubber material relative to each other. This lay-up of belt material layers and reinforcing cables, indicated at 33, which leaves the calendaring section 24 thus comprises two upper layers of rubber material, two lower layers of rubber material, and a plurality of longitudinally extending cables placed therebetween. The layers of rubber are uncured at this stage.

The next step is to move a section of this belt lay-up 33 into a curing press 34. It is to be understood that this curing press 34 is shown very schematically, and there is indicated upper and lower structures 36 and 38, with upper and lower platens 40 and 42 positioned therebetween. This curing press 34 is a relatively sophisticated piece of equipment arranged to have the platens 40 and 42 at predetermined temperature levels, with temperature gradients existing at the ends of these platens 40 and 42.

To the right of the curing press 34, there is first an x-ray station 44, and then a pull roller assembly 46, from which the finished belt 48 is wound at 50 onto a drum 52.

It is to be understood that all of the components recited above already exist in the prior art. The operation of this system 10 is as follows. The cables 14 are directed through the components 16 through 22 into the calendaring section 24. The rubber layers are fed from the rolls 26 through 32 to form the belt lay-up at 32. A section of the belt lay-up 32 is directed into the curing press 34, and then the travel of the belt lay-up is stopped.

Upper and lower platens 40 and 42 are then moved toward one another to grip the belt section 54 that is within the operating area of the curing press 34 to apply both heat and pressure to the belt section 54. Typically, for a belt section having a thickness of about 1.2 centimeters, the curing period would between about ten to thirty minutes. During this curing period, the rubber material softens to come into intimate contact with the cables 14, and the rubber material becomes vulcanized. After the curing period, the platens 40 and 42 are opened, and the operating line continues its operation to move the subsequent section of the belt lay-up 32 into the operating area of the curing press 34.

There are various functions of the system 12 which have not been described herein, since these are not really relevant to the present invention. For example, the manner in which the clamps 18 and 21, the pretensioning device 20 and the tension device 22 operate relative to the cables 14, to provide the proper tension thereon and release the cables, has not been described.

Again, as indicated above, all the components of the manufacturing system 10 which have been described thus far already exist in the prior art.

Figure 2:
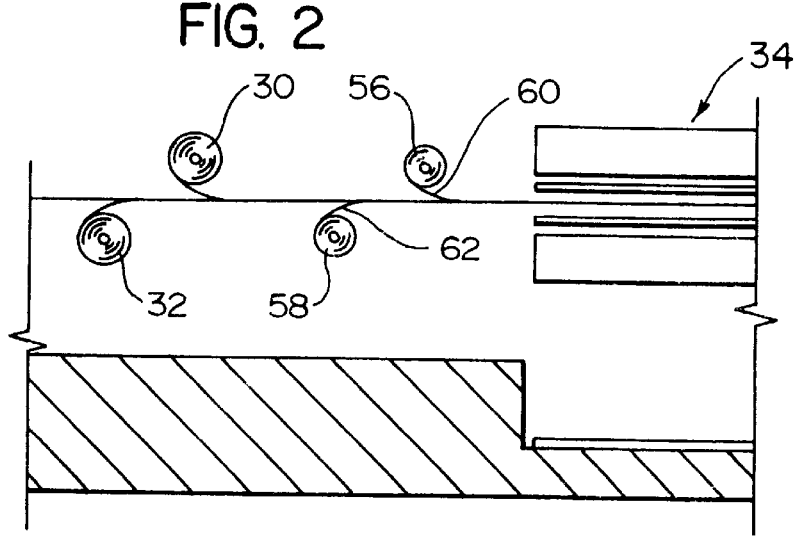
FIG. 2 is a view similar to FIGS. 1A and 1B, showing only that portion of the prior art belt manufacturing belt operation extending from the feed roll 32 to the first part of the platen. 34.

To incorporate the teachings of the present invention in this system as shown in FIG. 2, there is added to the belt manufacturing operation of FIGS. 1A and 1B a means to incorporate in the belt lay-up 33 of upper and lower layers of a parting material utilized in the method and apparatus of the present invention. Thus, as shown in FIG. 2, there are provided immediately to the right of the rolls 32 and 30 upper and lower rolls 56 and 58 of sheets of a parting material 60 and 62. When the operating line of the system 10, with the present invention incorporated therein, is functioning to move the lay-up 33 of the rubber layers and cables into the curing press 34, these rolls 56 and 58 are also caused to rotate to feed the upper and lower parting sheets 60 and 62 into the operating area between the platens 40 and 42 so as to be positioned above and below the belt lay-up section 54 within the curing press 34. The positioning of the parting material and the rubber body material immediately below is illustrated somewhat schematically in FIG. 2.

Then, when the platens 40 and 42 are moved into pressing contact with the belt lay-up section 54, the parting layers 60 and 62 become substantially imbedded in the surface portions of the rubber material in a manner to be described further below. Since the sheets of parting materials 60 and 62 are identical, it will be sufficient to describe the composition and characteristics of the upper sheet 60, with this description applying as well to the lower sheet 62.

The parting material 60 is a polymeric material having interstitial open spaces throughout. In the preferred form, this is an open cell foam material desirably having at least in part a cross linked molecular structure. This can be a thermoset or a thermoplastic material. The melting point (or other degradation point of the material should be higher than the vulcanizing temperature of the rubber material in the belt lay-up. If the parting material 60 is a thermoplastic material, the melting temperature should be above the curing temperature of the material forming the body of the belt. The typical optimized vulcanizing temperature usually is 143° C., plus or minus 3°, but it could be higher or lower, depending upon the agent that causes the chemical reaction.

Various polymeric materials can be used. These include materials in the polyolefin group such as polyethylenes, polypropylenes, polybutenes, and polyhexanes. Other candidates include polyurethanes, polyamide 6, polyamid 66, polyamids, polycarbonates, polyacetals, polyacrylates, polybutylene terephthalates, polyphenylene oxides, polyureas, silicones, polyester terephthalates, polyheptenes, and cross linked polyolefins.

As indicated above, the parting material is of open cell construction. In general it is more beneficial to have a greater proportion of open cell volume since the penetration of the adjacent rubber into the foam material is more easily accomplished. The density of the foam is generally in the lower range. For example, if a polyurethane foam is used, the density will be about fourteen kilograms per cubic meter. Higher density material could be used, however. If the density is too low, then the parting material becomes too fragile and the benefits are lost. Present experiment analysis indicates that if the density is as low as 10 kilograms per meter, this is less desirable. Within a broader range, the maximum pore size of the foam would be between about 0.1 to 4 millimeters. A 2 millimeter size would be desirable.

The thickness of the parting material is desirably in the range of 1 millimeter. For example, a thickness of 1.2 millimeters has been found to be satisfactory, and a thickness of 0.8 has been found to be closer to an optimum thickness. In general, the thinner parting material can be made, the better, with the lower limitation of thickness being that below which the material becomes too fragile to be used in a practical manner. The foam parting material is generally manufactured in blocks, and the sheet material can be cut from these blocks by cutting off thin slices. If the block of polymeric material is made in a continuous process, then slices can be cut from the block material as it is being produced.

In operation, with the upper and lower parting layers 60 and 62 being positioned within the operating area of the curing press, when the platens 40 and 42 are moved into contact with the parting material, these press against the parting material with a pressure which typically be in the range of five to forty kilograms per square centimeter. Also, the temperature at the surface of platens would be at least as high as the vulcanizing temperature, and possibly between 130° to 160° C., or higher.

As the temperature in the belt layer section that is within the curing press increases, there will be a certain amount of "out gassing" resulting from vaporization of various components within the rubber material. It has been found that these pass into the parting layers 60 and 62 in a manner that these do not form pockets of entrapped gas which would cause portions of the surface of the belt lay-up section to move away from the platen (which would cause splotches of discoloration or a different shade of covering). The manner in which this is accomplished has not been fully identified, but this can be due to the gases accumulating in the open spaces in the foam, and also to the gaseous substances flowing through passages through the parting material to move outside of the parting material.

Figure 3:
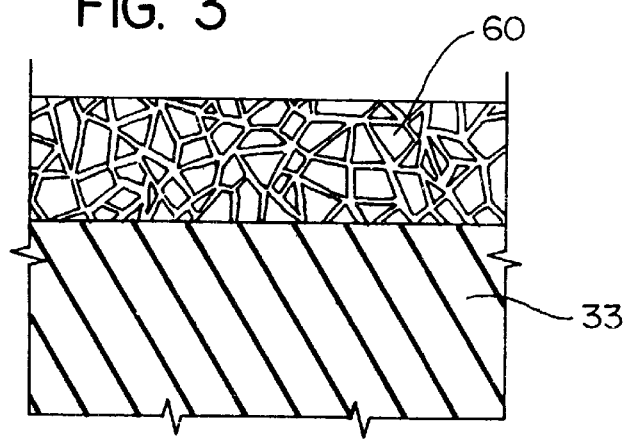
FIG. 3 is a sectional view taken along a section plane transverse to the upper surface of the belt, drawn to an enlarged scale, and showing the elastomeric parting material placed on the upper surface of the belt body, prior to application of the platens and vulcanizing of the rubber material of the body.
Figure 4:
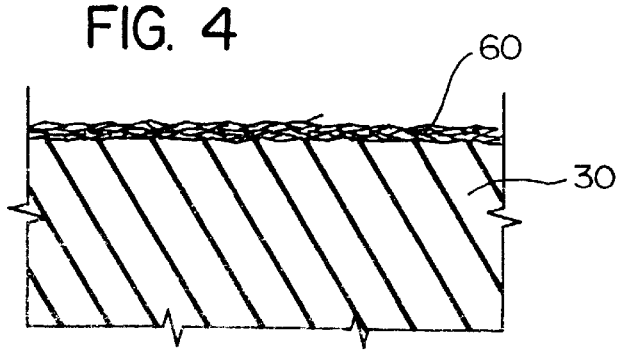
FIG. 4 is a sectional view similar to FIG. 3, but showing the surface portion after the application of the platens to the body and the parting material to form the finished belt section.

After the platens 40 and 42 have engaged the belt lay-up section 54 for a period of time, the rubber adjacent upper and lower surfaces of the lay-up section 54 begins to soften so that the layers of parting material 60 and 62 are pressed into the adjacent rubber surface material and so that the material rubber flows into the spaces or interstices in the foam material. By the time the curing process has been completed, the adjacent rubber material has permeated the parting material substantially entirely, so that when the belt section is moved out of the platens, the parting material is hardly visible. Rather, the visible effect is that the surface of the belt section has a soft texture that is substantially uniform over the entire surface of the belt section. This is believed to be due to the fact that the parting material, in combination with the rubber material embedded therein, provides very small irregularities so that the texture is what might be termed as "reflectively soft" and that it lacks a sheen or reflective glare. One benefit of this is that if there are small irregularities in the surface of the belt section, these are obscured by the visually soft texture of the surface. Also the parting layers 60 and 62 have been compressed to between about 5% to 25% (generally about 10%) of their initial thickness. In FIG. 3 the layer 60 is shown prior to being compressed, and in FIG. 4 the layer 60 is shown after having been compressed and being embedded into the material at the surface of the body 33.

Another important characteristic of the parting material is its elastomeric qualities or might be termed its "resiliency". The parting material of the present invention has a relatively high level of resiliency, and this is measured in accordance with its "tan δ". It has been found that using the parting material of the present invention, being embedded into the surface of the belt section, the resiliency of the rubber material portion adjacent to the surface is not compromised, and is possibly actually improved. This is in contrast with other parting agents which become embedded into the surface of the rubber belt material and degrade the resiliency of the rubber material. The importance of this was discussed earlier in this text under the section entitled "Background of the Invention". As indicated previously, this substantially reduces the energy losses due to the loaded belt passing over the support rollers. This is analogous to the situation where an automobile is being driven with its tires at a low pressure, as opposed to driving the automobile with higher pressure in the tires, where the resiliency is greater and thus the expenditure of energy is less.

The tan $\delta$ is defined as the ratio of loss modulus to dynamic modulus. Therefore, the smaller the tan $\delta$ is, the smaller the energy consumption is. Desirably the tan $\delta$ would be no greater than 0.1, and more desirably, no greater than 0.05, or possibly lower, such as 0.04, 0.03 or 0.02.

It is to be recognized that various modifications could be made to the present invention without departing from the basic teachings thereof.

What is claimed:

1. A method of manufacturing a conveyor belt section, comprising:
    a. providing an elongated body having upper and lower surfaces, said body comprising a rubber body material, said body material having a vulcanizing temperature;
    b. placing an open cell foam parting material adjacent to at least one of the upper and lower surfaces of the body, said parting material comprising at least one cured elastomer of the group consisting of: polybutene, polyhexane, polyurethane, polycarbonate, polyacetal, polyphenylene oxide, polyurea, silicone, polyheptene and crosslinked polyolefin, having interstitial open spaces having a maximum pore size of between 0.5 and 2 millimeters, and a melting or other degradation temperature higher than said vulcanization temperature;
    c. applying a heated platen to the upper and lower surfaces of the body to at least soften a surface portion of said body adjacent to the parting material and cause at least part of said body portion to flow into the interstitial open spaces, and also to cause said body material to vulcanize to form a conveyor belt section; and
    d. withdrawing said platen from said conveyor belt section;
    e. said conveyor belt section being formed such that the parting material and the adjacent belt surface portion become combined with the parting material being embedded in the adjacent surface portion of the body to provide a substantially uniform and reflectively soft surface texture.

2. The method as recited in claim 1, wherein said parting material has a tan $\delta$ of no greater than 0.1.

3. The method as recited in claim 1, wherein said parting material has a tan $\delta$ of no greater than 0.03.

4. The method as recited in claim 1, wherein the parting material has a melting or degradation temperature of above about 140° C.

5. The method as recited in claim 1, wherein said parting material is placed adjacent to both of said upper and lower surfaces of the body, so that an upper surface portion and a lower surface portion of the body have the parting material being embedded in the upper and lower portions of the body.

6. A conveyor belt section made in accordance with the method of claim 1.

* * * * *